(12) United States Patent
Agarwal et al.

(10) Patent No.: US 12,271,261 B2
(45) Date of Patent: Apr. 8, 2025

(54) DATA STORAGE DEVICE AND METHOD FOR HOST-ASSISTED IMPROVED ERROR RECOVERY USING A CORRELATION FACTOR

(71) Applicant: Western Digital Technologies, Inc., San Jose, CA (US)

(72) Inventors: Dinesh Kumar Agarwal, Bangalore (IN); Amit Sharma, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 69 days.

(21) Appl. No.: 18/223,128

(22) Filed: Jul. 18, 2023

(65) Prior Publication Data
US 2024/0296089 A1   Sep. 5, 2024

Related U.S. Application Data

(60) Provisional application No. 63/449,802, filed on Mar. 3, 2023.

(51) Int. Cl.
*G06F 11/00*   (2006.01)
*G06F 11/10*   (2006.01)

(52) U.S. Cl.
CPC .................. *G06F 11/1016* (2013.01)

(58) Field of Classification Search
CPC ............. G06F 11/1016; G06F 11/0727; G06F 11/1044; G06F 11/1072
See application file for complete search history.

(56) References Cited

U.S. PATENT DOCUMENTS

| | | | |
|---|---|---|---|
| 5,170,400 A | | 12/1992 | Dotson |
| 6,038,339 A | * | 3/2000 | Hubel ........................ G06T 7/90 |
| | | | 358/518 |
| 9,110,797 B1 | * | 8/2015 | Lazier ................ G11B 20/1883 |
| 9,712,287 B2 | | 7/2017 | Krishnan et al. |
| 10,025,512 B2 | * | 7/2018 | Wang ................... G06F 11/1076 |
| 10,276,247 B2 | | 4/2019 | Alhussien et al. |
| 10,616,576 B2 | | 4/2020 | Ameres et al. |
| 2017/0004037 A1 | | 1/2017 | Park et al. |
| 2022/0365698 A1 | * | 11/2022 | Agarwal ............... G06F 3/0671 |
| 2024/0106461 A1 | * | 3/2024 | Oboukhov .......... H03M 13/618 |

* cited by examiner

*Primary Examiner* — Joseph D Manoskey
(74) *Attorney, Agent, or Firm* — Crowell & Moring LLP

(57) ABSTRACT

A data storage device and method for host-assisted improved error recovery using a correlation factor are provided. In one embodiment, the data storage device receives, from a host, an indication that data associated with a first logical address is correlated with data associated with a second logical address; determines a correlation factor based on a degree of correlation between the data associated with the first logical address and the data associated with the second logical address; and in response to the correlation factor being above a threshold: stores the data associated with the first logical address and the data associated with the second logical address in different regions of the memory having different bit error rates; and uses the data associated with the first logical address to assist in correcting an error in the data associated with the second logical address. Other embodiments are provided.

20 Claims, 10 Drawing Sheets

DATA STORAGE DEVICE AND METHOD FOR HOST-ASSISTED IMPROVED ERROR RECOVERY USING A CORRELATION FACTOR

CROSS-REFERENCE TO RELATED APPLICATION

This application claims priority to U.S. provisional patent application No. 63/449,802, filed Mar. 3, 2023, which is hereby incorporated by reference.

BACKGROUND

There is sometimes a need to maintain various versions of data as the data is changed over time (e.g., maintaining a previous version and a current version of the data). An error detection and correction operation can be used to identify errors in the data and attempt to correct the errors.

DETAILED DESCRIPTION

Figure 1A:
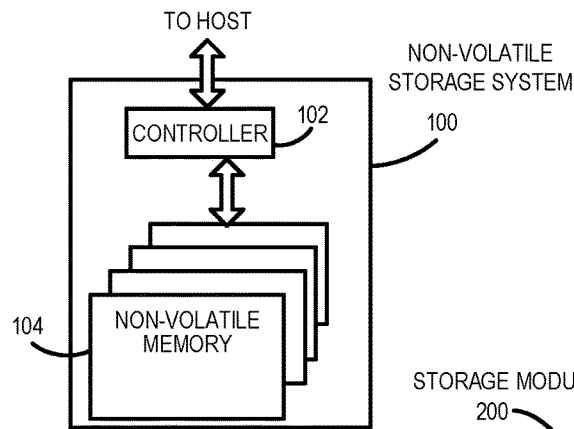
FIG. 1A is a block diagram of a data storage device of an embodiment.

The following embodiments generally relate to a data storage device and method for host-assisted improved error recovery using a correlation factor. In one embodiment, a data storage device is provided comprising a memory and a controller. The controller is configured to receive, from a host, an indication that data associated with a first logical address is correlated with data associated with a second logical address; determine a correlation factor based on a degree of correlation between the data associated with the first logical address and the data associated with the second logical address; and in response to the correlation factor being above a threshold: store the data associated with the first logical address and the data associated with the second logical address in different regions of the memory having different bit error rates; and use the data associated with the first logical address to assist in correcting an error in the data associated with the second logical address.

In some embodiments, the controller is further configured to determine the correlation factor using an exclusive-or (XOR) operation.

In some embodiments, the controller is further configured to generate a correlation matrix from a plurality of correlation factors associated with a plurality of sets of logical addresses.

In some embodiments, the controller is further configured send the correlation matrix to the host.

In some embodiments, the correlation matrix comprises a plurality of levels.

In some embodiments, the controller is further configured use the correlation matrix in an iterative fashion during an error correction operation.

In some embodiments, the data associated with the first logical address comprises an original version and the data associated with the second logical address comprises a modified version.

In some embodiments, the data associated with the first logical address comprises a media file and the data associated with the second logical address comprises a data adjacent to the media file.

In some embodiments, the data associated with the first logical address and the data associated with the second logical address are from related applications on the host.

In some embodiments, the indication is received from the host in response to the data storage device informing the host that the data storage device supports correlation-matrix-based error recovery.

In some embodiments, the memory comprises a three-dimensional memory.

In another embodiment, a method is provided that is performed in a data storage device comprising a memory and in communication with a host. The method comprises: receiving, from the host, a correlation matrix comprising a plurality of degrees of correlation in data associated with a plurality of sets of logical addresses; storing data associated with a certain degree of correlation in different regions of the memory having different bit error rates; and using the correlation matrix during an error correction operation.

In some embodiments, an exclusive-or (XOR) operation is used to determine the degrees of correlation.

In some embodiments, the correlation matrix comprises a plurality of levels.

In some embodiments, the method further comprises using the correlation matrix in an iterative fashion during the error correction operation.

In some embodiments, the data in the sets of logical addresses comprises an original version and a modified version of a same data set.

In some embodiments, the data in the sets of logical address comprises a media file and data adjacent to the media file.

In some embodiments, the data in the sets of logical addresses are from related applications on the host.

In some embodiments, the correlation matrix is received from the host in response to the data storage device informing the host that the data storage device supports correlation-matrix-based error recovery.

In another embodiment, a data storage device is provided comprising: a memory; means for generating a correlation matrix comprising a plurality of correlation factors; means for storing data associated with a certain correlation factor in different regions of the memory; and means for using the correlation matrix during an error correction operation.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
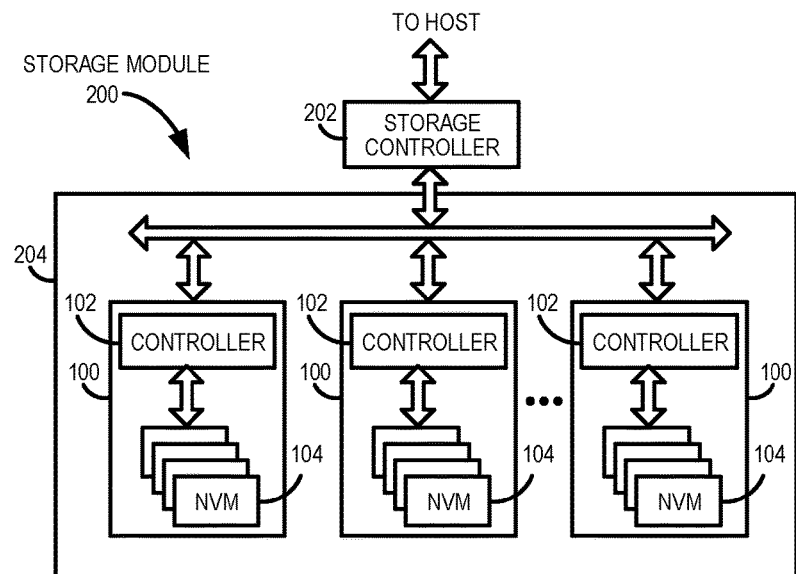
FIG. 1B is a block diagram illustrating a storage module of an embodiment.
Figure 1C:
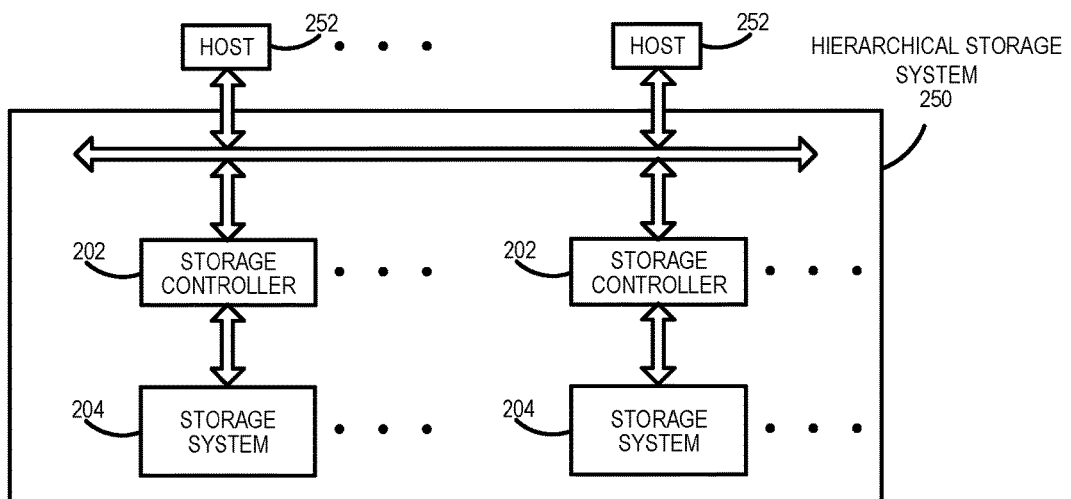
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
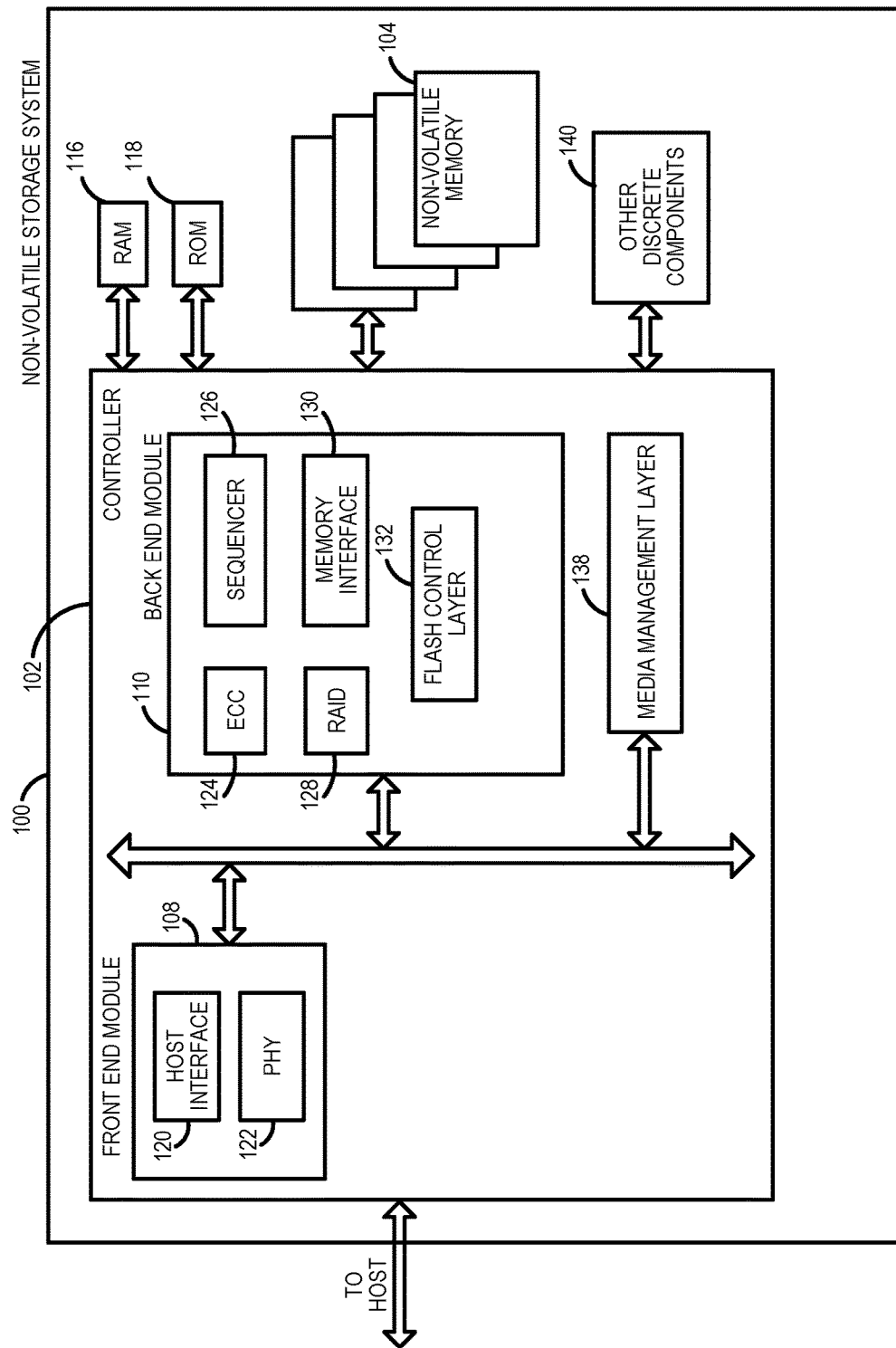
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
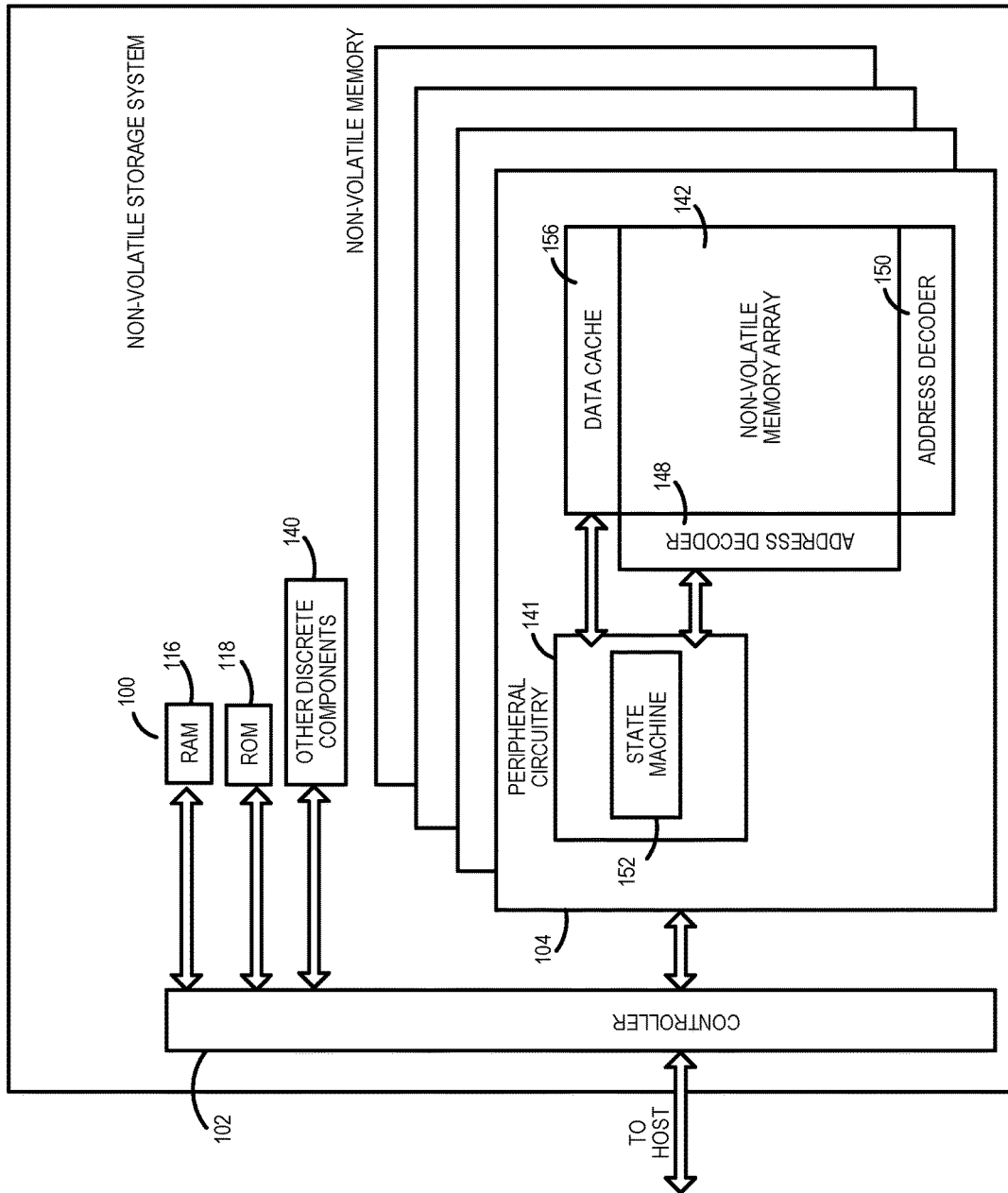
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
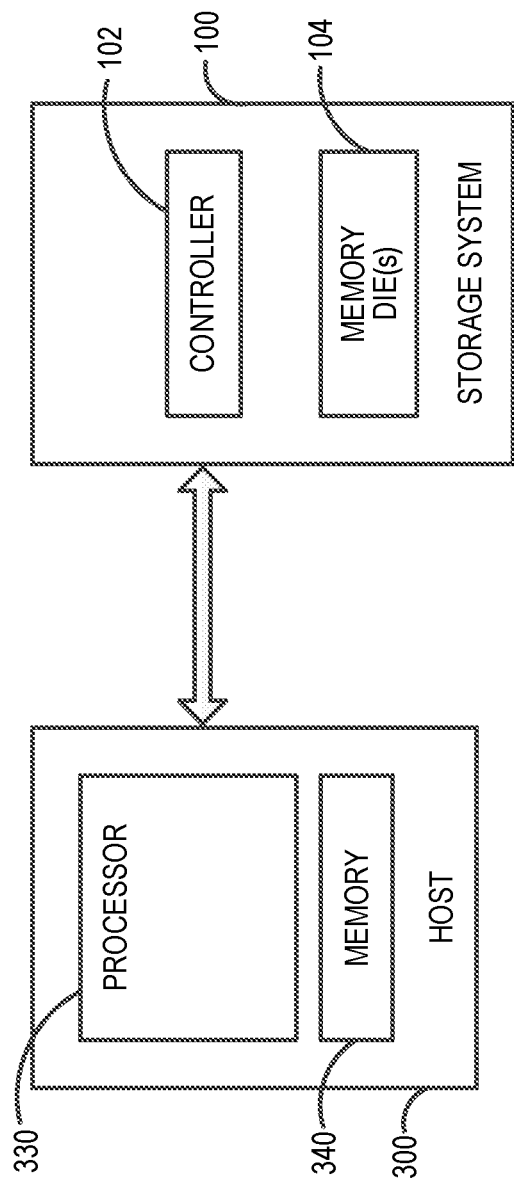
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, there is sometimes a need to maintain various versions of data as the data is changed over time (e.g., maintaining a previous version and current version of the data). An error detection and correction operation can be used to identify errors in the data and attempt to correct the errors.

The following embodiments recognize that there may be efficiency in the error detection and correction process due to the fact that different version of data may be correlated. That is, when data and a modified (e.g., edited) version of the data are stored in the memory 104, there may not be a large deviation between the original (base) data and the modified version of the data (delta). Also, when the host 300 is using multiple applications, the data from those applications may be highly correlated. More specifically, when a media file is written and modified, data adjacent to the media file can have a lot of correlation. The repetition caused by the correlation can be used by an error handling engine in the controller 102 to correct errors.

In one embodiment, the host 300 can maintain segmented version tracking. In this embodiment, the host 300 can send a simple indication to the data storage device 100 regarding which data may be correlated without worrying about the actual correlation factor. The controller 102 in the data storage device 100 can analyze the data in the logical block addresses (LBAs) indicated by the host 300 as being correlated to see how much of the data is common (e.g., to determine a degree of correlation). From that analysis, the controller 102 can generate a correlation factor and eventually form a matrix of correlation factors based on all existing correlation factors corresponding to sets of LBAs indicated by the host 300 to be correlated. Alternatively, the host 300 can generate the correlation factor/matrix and send it to the data storage device 100. The controller 102 of the data storage device 100 can also segregate data to different bit error rate (BER) regions in the memory 104 based on the correlation factor (e.g., if the correlation factor is above a threshold value), so that highly-correlated data do not get corrupted at the same time. So, data associated with a certain correlation factor can be stored in different regions of the memory 104. (As used herein, "associated with a certain correlation factor" can mean associated with a single correlation factor or a range of correlation factors.) In case of error, the correlation matrix can be used to recover the original data.

So, in some embodiments, the host 300 provides an indication of which LBAs may be correlated (e.g., based on adjacent media data or based on the application in the host 300 associated with the data). The controller 102 of the data storage device 100 can check the correlation factor and generate correlation matrices for the given LBAs. The controller 102 of the data storage device 100 can also segregate data based on the correlation factor to the different BER groups. Further, the controller 102 in the data storage device 100 or the host 300 can use correlated data based on the correlation matrix of LBAs to improve error recovery in the event of an error.

Figure 4:
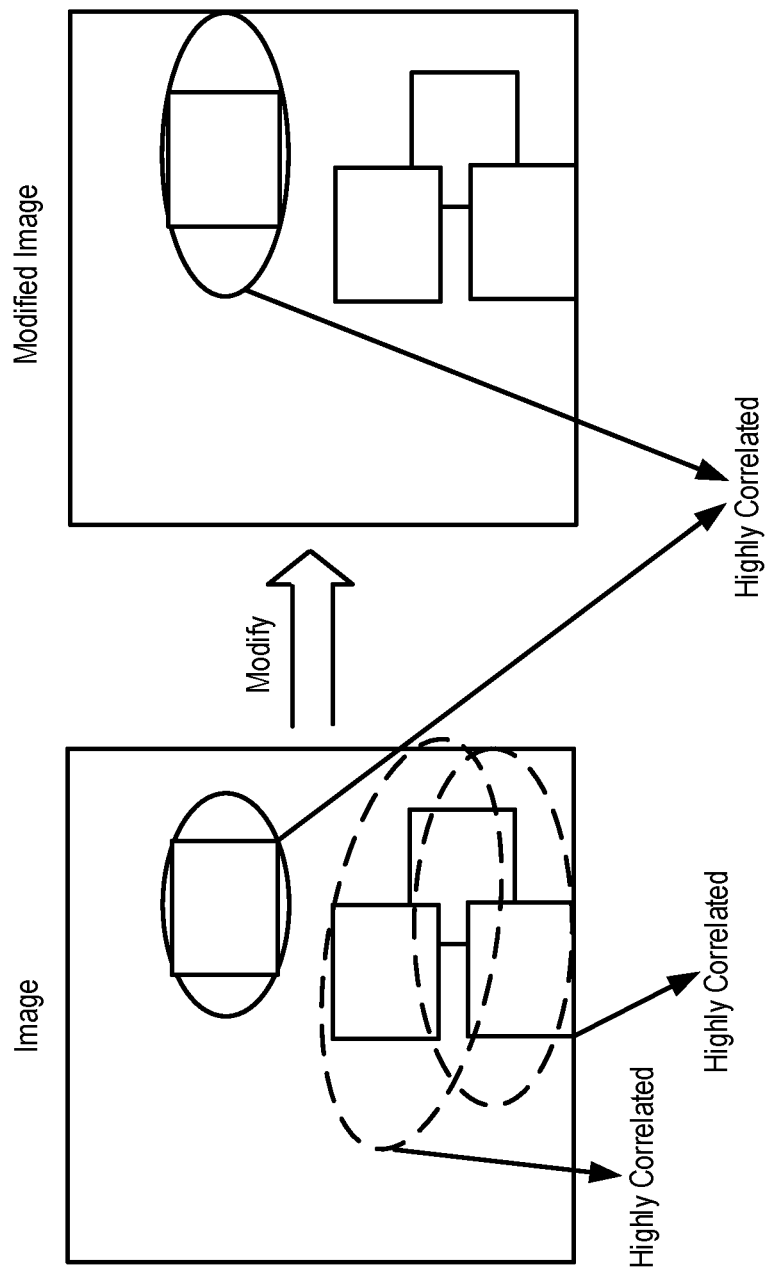
FIG. 4 is a diagram illustrating data of an embodiment that is correlated for different logical block address ranges.
Figure 5:
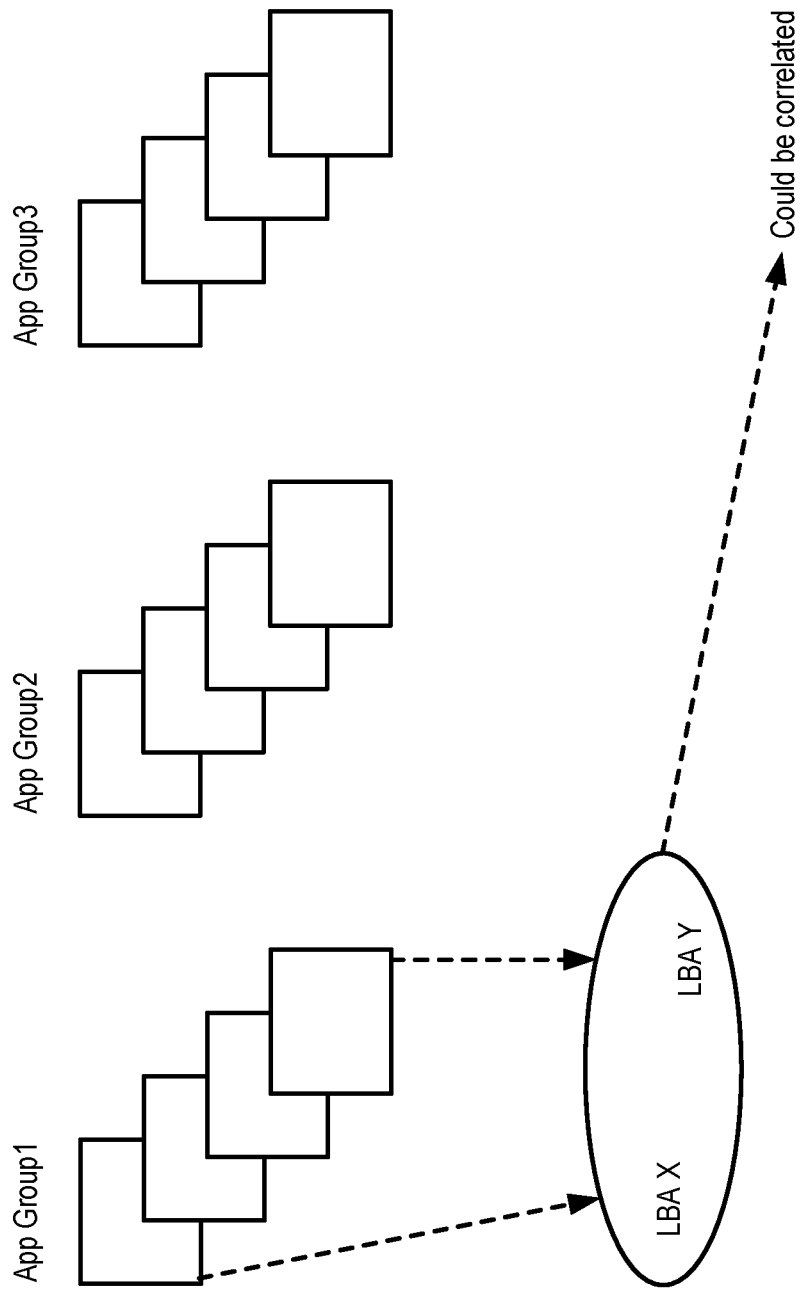
FIG. 5 is a diagram illustrating how similar applications on a host of an embodiment can access correlated data.

FIG. 4 is a diagram that shows when data can be correlated for different LBA ranges. Here, the data is an image, and when some of the image is modified, it still may be highly-correlated with the previous version of the image. Further, even adjacent sub-images or pixel data may be correlated. In this example, the host 300 is aware of these scenarios and can send the indication to data storage device 100. Also, as shown in FIG. 5, similar applications on the host 300 may access the data, and their actual data may be somewhat correlated. This can be utilized to define the correlation factor and, eventually, matrices.

Figure 6:
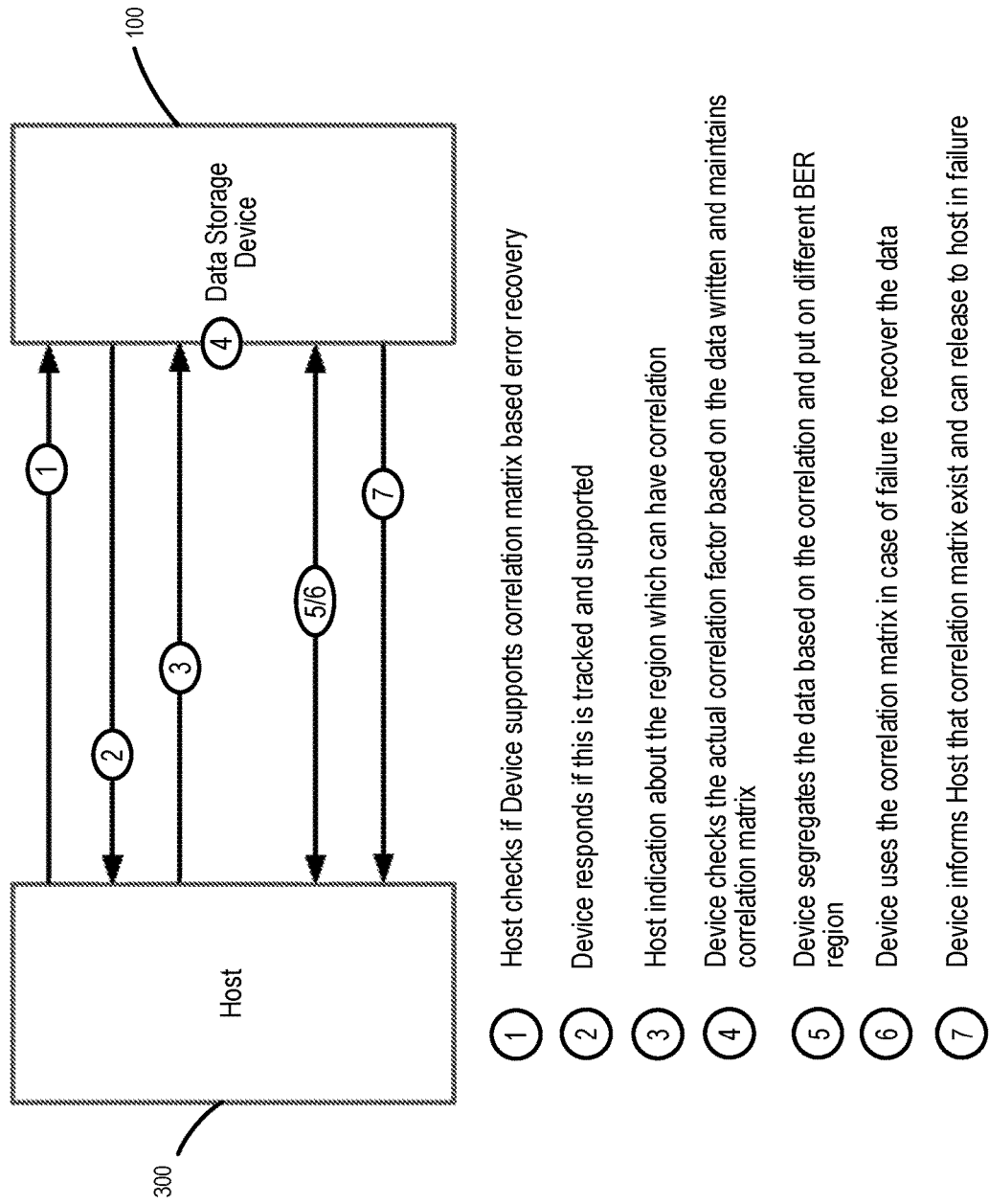
FIG. 6 is a diagram illustrating features of a command interface of an embodiment.

These embodiments can also involve various communications between the host 300 and the data storage device 100. In one embodiment, the communication to identify the correlated LBAs does not take any bus bandwidth and can be managed by specific commands. FIG. 6 is a diagram of features of an example command interface. As shown in FIG. 6, the host 300 checks if the data storage device 100 supports correlation-matrix-based error recovery (act 1), and the data storage device 100 responds accordingly (act 2). The host 300 then provides an indication about the region that may have correlation (act 3). The data storage device 100 then checks the actual correlation factor based on the data written and maintains the correlation matrix (act 4). Then, the data storage device 100 segregates the data based on the correlation (e.g., data with the same or similar correlation factor) and puts the segregated data in different BER regions in the memory 104 (act 5). The data storage device 100 then uses the correlation matrix in cases of failure to recover the data (act 6). Finally, the data storage device 100 can inform the host 300 that the correlation matrix exists and can release it to the host 300 (act 7).

Figure 7:
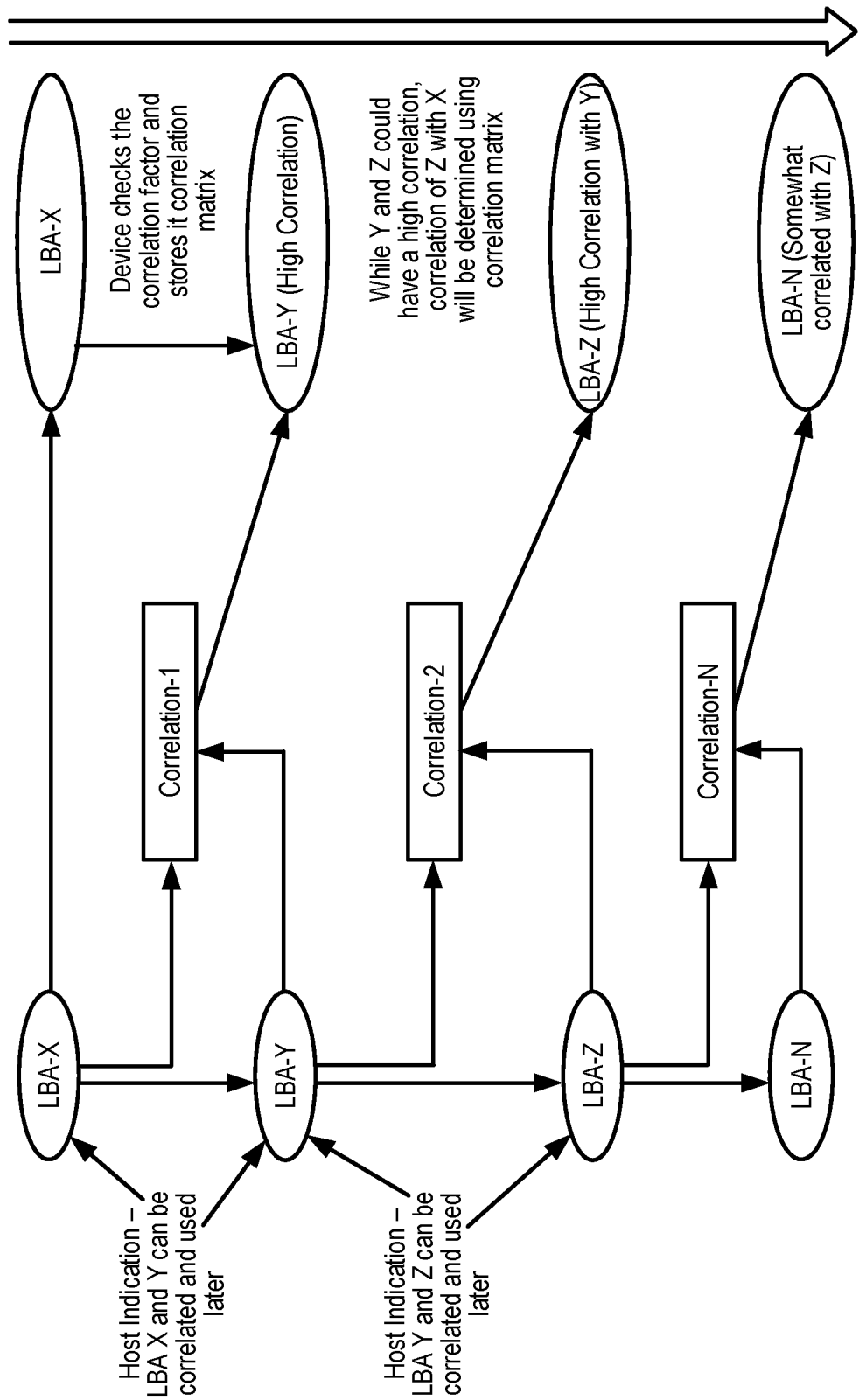
FIG. 7 is a diagram illustrating a method of an embodiment for creating a correlation matrix.

Based on the indication of which data may be correlated, the correlation factor can be generated for a set of data (e.g., of a configurable length to cover a set of LBAs). Based on the earlier correlation factors available, the second and third level of correlation factors are also available. All these factors can be used to form the correlation matrix. To calculate the correlation factor, any simple mechanism of exclusive-or (XOR) can be used and integrated on the bus to make it performance efficient. This is shown in the FIG. 7. As shown in FIG. 7, LBA X has the highest correlation with LBA Y, and LBA Y has high correlation with LBA Z, but LBA X and LBA Z have a somewhat-lower correlation. This is used to form correlation matrices for a few levels based on accuracy or defect parts per million (DPPM) requirements.

Figure 8:
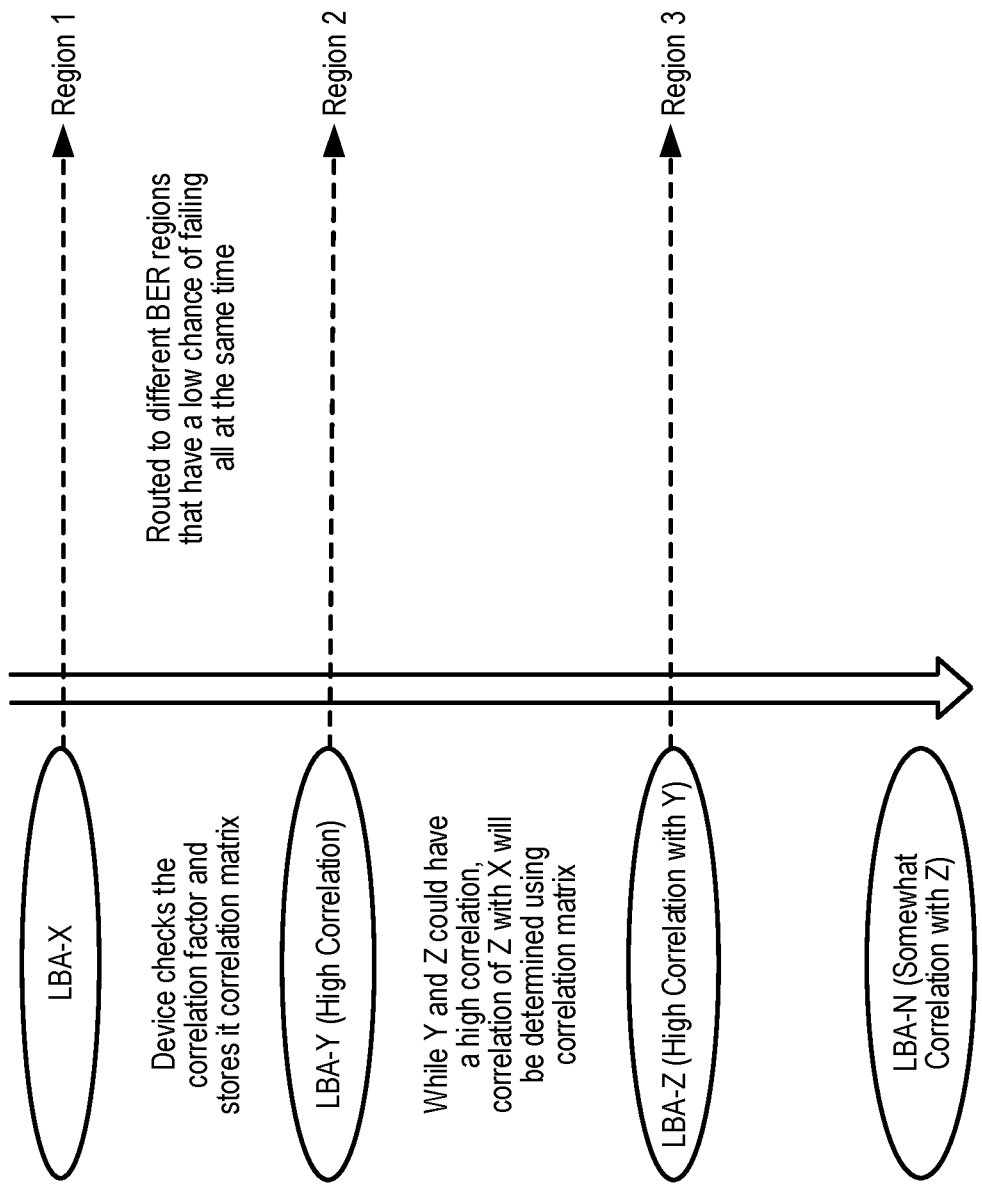
FIG. 8 is a diagram illustrating a method of an embodiment for using a correlation factor to segregate data.

The controller 102 of the data storage device 100 can use the correlation factor to segregate data. Once the correlation factor is determined, the controller 102 can try to make sure highly-correlated data (e.g., data having a correlation factor value above a threshold or data having the same or similar correlation values) is kept in different BER regions, so that the higher failure rates are not seen for similar data simultaneously. Also, if one set of highly-correlated data is put into a bad BER region, the new set can be put into a good BER region to reduce the overall chances of failures and improving DPPM. This is illustrated in FIG. 8.

Figure 9:
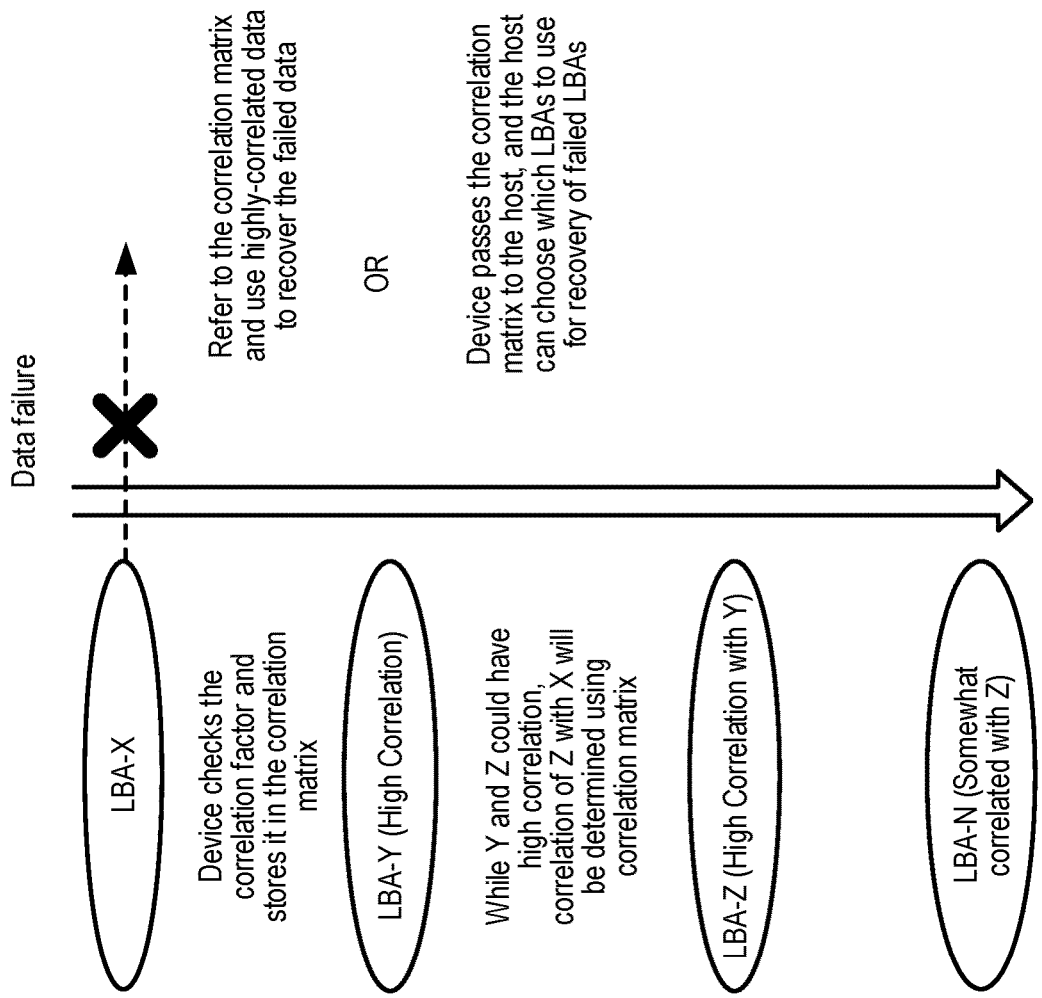
FIG. 9 is a diagram illustrating a method of an embodiment for using a correlation matrix to recover data.

Once a failure happens, the controller 102 can use the correlation matrices to recover the data. This is illustrated in FIG. 9. Here, the correlation matrices can be used in an iterative fashion, where, first, the data with the highest correlation factor is tried, and then the data with a relatively-lesser correlation factor is tried. All the error handling engines in the controller 102 can work using the correlated data, and this information can be seamlessly used for reducing the error rate and improving DPPM. Alternatively, the controller 102 in the data storage device 100 can pass the correlation matrix of the failed LBAs to the host 300, and the host 300 can performs the error recovery.

There are several advantages associated with these embodiments. For example, these embodiments can be used to reduced error rates and improve overall DPPM. Also, these embodiments can involve minimal movement of data on the bus and can be managed via commands, making it time-optimal and fast.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
  a memory; and
  a processor configured to communicate with the memory and further configured to:

receive, from a host, an indication that data associated with a first logical address is correlated with data associated with a second logical address;

determine a correlation factor based on a degree of correlation between the data associated with the first logical address and the data associated with the second logical address; and in response to the correlation factor being above a threshold:

store the data associated with the first logical address and the data associated with the second logical address in different regions of the memory having different bit error rates; and use the data associated with the first logical address to assist in correcting an error in the data associated with the second logical address.

2. The data storage device of claim 1, wherein the processor is further configured to determine the correlation factor using an exclusive-or (XOR) operation.

3. The data storage device of claim 1, wherein the processor is further configured to generate a correlation matrix from a plurality of correlation factors associated with a plurality of sets of logical addresses.

4. The data storage device of claim 3, wherein the processor is further configured send the correlation matrix to the host.

5. The data storage device of claim 3, wherein the correlation matrix comprises a plurality of levels.

6. The data storage device of claim 3, wherein the processor is further configured use the correlation matrix in an iterative fashion during an error correction operation.

7. The data storage device of claim 1, wherein the data associated with the first logical address comprises an original version and the data associated with the second logical address comprises a modified version.

8. The data storage device of claim 1, wherein the data associated with the first logical address comprises a media file and the data associated with the second logical address comprises a data adjacent to the media file.

9. The data storage device of claim 1, wherein the data associated with the first logical address and the data associated with the second logical address are from related applications on the host.

10. The data storage device of claim 1, wherein the indication is received from the host in response to the data storage device informing the host that the data storage device supports correlation-matrix-based error recovery.

11. The data storage device of claim 1, wherein the memory comprises a three-dimensional memory.

12. A method comprising:

performing in a data storage device comprising a memory and in communication with a host:

receiving, from the host, a correlation matrix comprising a plurality of degrees of correlation in data associated with a plurality of sets of logical addresses;

storing data associated with one of the plurality of degrees of correlation in different regions of the memory having different bit error rates; and using the correlation matrix during an error correction operation.

13. The method of claim 12, wherein an exclusive-or (XOR) operation is used to determine the plurality of degrees of correlation.

14. The method of claim 12, wherein the correlation matrix comprises a plurality of levels.

15. The method of claim 12, further comprising using the correlation matrix in an iterative fashion during the error correction operation.

16. The method of claim 12, wherein the data in the sets of logical addresses comprises an original version and a modified version of a same data set.

17. The method of claim 12, wherein the data in the sets of logical address comprises a media file and data adjacent to the media file.

18. The method of claim 12, wherein the data in the sets of logical addresses are from related applications on the host.

19. The method of claim 12, wherein the correlation matrix is received from the host in response to the data storage device informing the host that the data storage device supports correlation-matrix-based error recovery.

20. A data storage device comprising:

a memory; and means for:

receiving, from a host, an indication that data associated with a first logical address is correlated with data associated with a second logical address;

determining a correlation factor based on a degree of correlation between the data associated with the first logical address and the data associated with the second logical address; and in response to the correlation factor being above a threshold:

storing the data associated with the first logical address and the data associated with the second logical address in different regions of the memory having different bit error rates; and using the data associated with the first logical address to assist in correcting an error in the data associated with the second logical address.

\* \* \* \* \*